United States Patent [19]

Čapek et al.

[11] Patent Number: 4,775,961
[45] Date of Patent: Oct. 4, 1988

[54] TACTILE SENSOR

[75] Inventors: Jan Čapek; Miloslav Neveselý; Milan Lanský, all of Zilina, Czechoslovakia

[73] Assignee: Vysoka skola dopravy a spojov v Ziline, Zolina, Czechoslovakia

[21] Appl. No.: 877,876

[22] Filed: Jun. 24, 1986

[30] Foreign Application Priority Data

Jun. 24, 1985 [CS] Czechoslovakia ............... 4623-85

[51] Int. Cl.⁴ .................. H04R 1/02; H01L 41/04
[52] U.S. Cl. .......................... 367/140; 310/313 D; 310/313 R; 331/107 A; 333/195
[58] Field of Search ........... 310/313 B, 313 C, 313 D, 310/313 R, 320, 324, 338, 348, 349, 350, 351, 352, 353, 354, 355, 356, 357, 358, 359, 360, 361, 362, 363, 364, 365, 366; 340/365 A; 367/140, 141, 153, 157, 163, 164, 174, 909; 333/152, 153, 195; 331/107 A

[56] References Cited

U.S. PATENT DOCUMENTS

| | | | |
|---|---|---|---|
| 3,878,477 | 4/1975 | Dias et al. | 331/107 A |
| 4,216,401 | 8/1980 | Wagner | 310/313 R |
| 4,504,758 | 3/1985 | Wisbey | 310/313 R |
| 4,512,198 | 4/1985 | Sinha et al. | 310/338 X |
| 4,634,917 | 1/1987 | Dvorsky et al. | 310/338 X |
| 4,644,804 | 2/1987 | Ramm et al. | 310/338 X |

FOREIGN PATENT DOCUMENTS

| | | |
|---|---|---|
| 2438221 | 2/1975 | Fed. Rep. of Germany . |
| 2556780 | 6/1976 | Fed. Rep. of Germany . |
| 901821 | 10/1980 | U.S.S.R. . |
| 769331 | 1/1982 | U.S.S.R. . |

Primary Examiner—Deborah L. Kyle
Assistant Examiner—Brian S. Steinberger
Attorney, Agent, or Firm—Klein & Vibber

[57] ABSTRACT

This invention relates to a tactile sensor that is particularly suitable for use in robotics. The tactile sensor enables a robot, cybernetic device, or other appropriate automatic mechanism to sense an object, to measure the force of contact, and to determine the force necessary to seize the object. Acoustic surface waves propagated along the surface of an insulating plate within the sensor, and disrupted by contact with the sensor, are used to achieve this purpose.

9 Claims, 1 Drawing Sheet

TACTILE SENSOR

This invention relates to a tactile sensor that is particularly suitable for use in robotics. The tactile sensor enables a robot, cybernetic device, or other appropriate automatic mechanism to sense an object, to measure the force of contact, and to determine the force necessary to seize the object. Acoustic surface waves propagated along the surface of an insulating plate within the sensor, and disrupted by contact with the sensor, are used to achieve this purpose.

BACKGROUND OF THE INVENTION

A number of tactile sensors are known to be useful in cybernetic applications, but each of the known devices suffers from disadvantages which have been overcome by the present invention. Contact sensors, or switches, have been used to sense an object, but these devices generally require a large space or surface area for pressure sensitive elements. See, DBR Pat. No. 2,556,780. Other contact sensors rely on some means of converting pressure to an electrical capacitance or inductive signal. See, USSR Pat. Nos. 769,331 and 901,831. A method of using an array or matrix of resistance-sensitive charge-generating elements is also known. See, Overton, U.S. Pat. No. 4,481,815. A photoelectric method is described in DBR Pat. No. 2,438,221.

The contact methods which rely on integral pressure sensitive elements require that the gripped object be perfectly clean, in order to prevent choking of the integral element channels. Contact sensors which employ an inductive resistance method require the generation of a minimum contact force, sufficient to shift a core, bend or stretch a tensometer, and secure a reliable contact. Capacitive contact sensors require the screening of electrodes in a multichannel arrangement. Photoelectric methods require light-reflective materials, and elastomeric materials require the use of a special amplifier.

SUMMARY OF THE INVENTION

It is an object of this invention to provide a tactile sensor particularly suitable for a robot of simple design, which reliably indicates the contact of the sensor with a certain part of an object and which also permits the simultaneous determination of the force necessary to grip the object. The tactile sensor, according to the invention, relates to a contact and/or force sensing means comprising an insulating plate provided on one side with interdigital transducers of acoustic surface waves and on the other side with an oscillator, and further comprising a diaphragm with projections. When contact with an object must be indicated, contact-sensitive interdigital transducers are disposed on the insulating plate and the diaphragm is situated above the contact-sensitive interdigital transducers. When a force-sensitive arrangement is also desired, force-sensitive interdigital transducers of acoustic surface waves can be disposed on the same side of the plate as the contact-sensitive transducers, or on the other side of the plate, with the diaphragm projections having a width smaller than the width of the interdigital transducers of acoustic surface waves.

The input terminals of the interdigital transducers can be connected independently or in series, and an alternating signal is received from the output terminals. Pairs of oppositely situated interdigital transducers form a resonator, which in turn is part of the oscillator. A contact is indicated by interruption of the acoustic surface wave propagation along the surface of the insulating plate and a zero output signal. When force-sensitive transducers are used, information about the force of the contact is also indicated. For acoustic wave transducers which respond to bending or distortion of the insulating plate, the force is proportional to the change in frequency of the output signal.

The oscillator and compensating or calibration circuitry is placed on the insulating plate, thereby reducing the number of necessary conductors. Additional force sensors of differing design may be employed. The insulating plate provided with force-sensitive interdigital acoustic wave transducers can be positioned 180 degrees with respect to the surface of the object, so that contact takes place head-on, and not from the side of the transducers or the insulating plate; or the transducers can be positioned so that a contact from the side can be sensed and evaluated. When the arrangement is designed to detect and measure contacts from the side, the diaphragm projections are smaller in width than the width of the interdigital transducers, so that only a part of the acoustic surface wave is interrupted.

The main advantage of the tactile sensor according to the invention is that positive information is provided about a contact with an object by interruption of an output signal from interdigital acoustic transducers, which also may be used to indicate the force of the contact. The sensor is simple in design, and may readily be miniaturized and formed into groups and matrices, so that complex sensing tasks and tactile activities can be imitated, such as actions of a human hand.

BRIEF DESCRIPTION OF THE DRAWINGS

Exemplary embodiments of the invention are set forth in the accompanying drawings, where.

DETAILED DESCRIPTION

Figure 1:
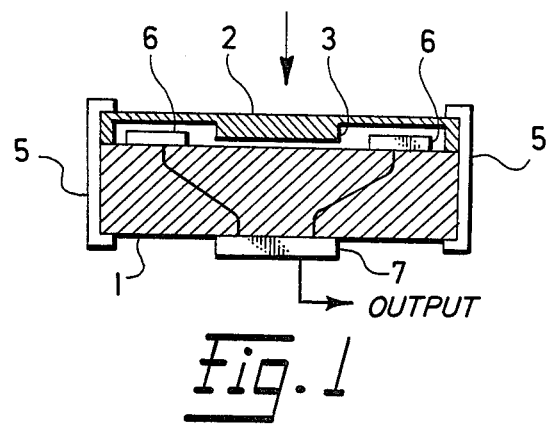
FIG. 1 is a sectional view of a tactile sensor.

With reference to FIG. 1, the tactile sensor comprises a sensing unit provided with an insulating plate 1, interdigital transducers of acoustic surface waves 6 placed on one side of the plate, and oscillator 7 placed on the other side of the plate. A diaphragm 2 provided with projections 3 is situated above the insulating plate 1, on the side having interdigital transducers 6, and is secured in place by clamps 5. A gap is left between the projection 3 of diaphragm 2 and the surface of plate 1.

In one embodiment, the insulating plate 1 is quartz, the oscillator 7 is affixed to one side of the plate 1 and operates within the range of tens of megahertz, and a pair of interdigital transducers 6 is affixed to the other side of the plate 1. The oscillator 7 and at least one of the transducers 6 form a resonant circuit which propagates acoustic surface waves along the surface of plate 1.

Figure 2:
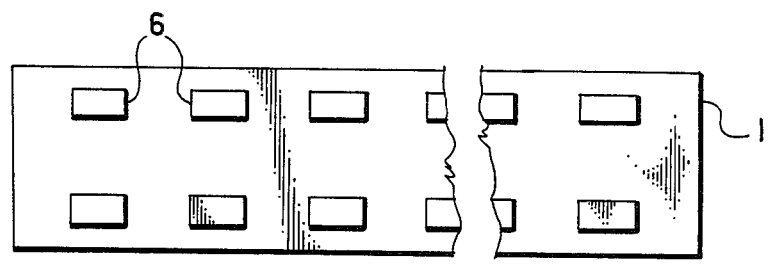
FIG. 2 is a top view of an insulating plate of a tactile sensor with a number of interdigital transducers of acoustic surface waves applied thereon.

FIG. 2 shows a top view of an embodiment of the tactile sensor of the invention wherein plate 1 is provided with a number of pairs of interdigital transducers 6. An oscillator 7 can be provided below each pair, on the underside of the plate 1, or a single oscillator 7 can be shared by a number of pairs of transducers 6. Similarly, each pair can be provided with its own diaphragm 2, or a number of pairs can share a single diaphragm. In one embodiment of the invention, some of the pairs of transducers 6 can be arranged to respond to different frequencies.

If contact or pressure occurs within a certain region of the diaphragm 2 with projection 3 situated between a pair of interdigital transducers 6, and if projection 3 is at least the same width as the pair of transducers 6, then the projection 3 touches the surface of insulating plate 1 and thereby interrupts the flow of acoustic waves propagated along its surface by the the resonant circuit formed by oscillator 7 and the pair of transducers 6. This results in a zero signal output at oscillator 7, and indicates contact by an object with the sensor.

Figure 4:
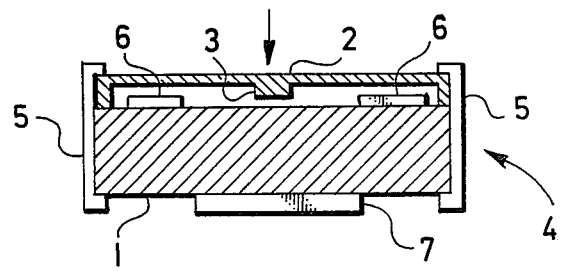
FIG. 4 is a sectional view of a tactile sensor adapted for indication of both a contact and the applied force.

To determine the pressure or force of contact by an object with diaphragm 2 whose projections 3 are in contact with plate 1, a narrower projection 3 is used. This force-sensitive embodiment employs a projection 3 that is smaller in width than the width of a transducer 6, thereby only partially interrupting the acoustic surface waves propagated along the surface of the plate by the resonant circuit formed by oscillator 7 and the pair of transducers 6. In addition, increasing pressure causes bending or deformation of the insulating plate 1, which prolongs the path of the acoustic surface waves and results in a change in the output frequency of oscillator 7. The degree of interruption and the changes in frequency are proportional to the pressure on diaphragm 2, which indicates the force of the contact with the sensor. In this embodiment, the insulating plate 1 must be adequately supported, to permit bending. A tactile sensor of this type is shown in FIG. 4.

Figure 3:
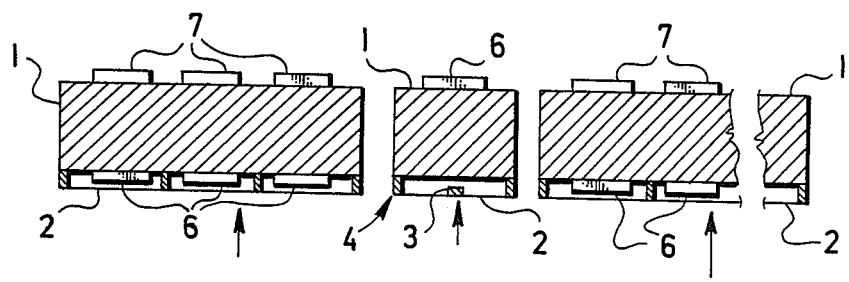
FIG. 3 is a sectional view of a tactile sensor with a force-sensing element between a number of elements as shown in FIG. 1 or FIG. 4.

The force acting on diaphragm 2 may also be measured according to an embodiment shown in the central portion of FIG. 3. The left and right portions of FIG. 3 show the embodiments of FIG. 1 or FIG. 4, except that the arrangement has been rotated 180 degrees, so that the pressure is acting from below. In the central portion of FIG. 3, a force sensor 4 is arranged wherein the interdigital transducer 6, and not an oscillator 7, is on the opposite side of insulating plate 1 and diaphragm 2. Pressure acting on diaphragm 2 causes deformation of plate 1, with a resulting proportional change in output frequency. No oscillator 7 is shown in force sensor 4, which may receive oscillations from adjacent oscillators. The elements of the arrangement according to FIG. 3 are drawn separately, but they can of course be arranged close together, and may even be provided with a common insulating plate 1 and diaphragm 2.

Elements according to this invention may be arranged in suitable groups, arrays, matrices and patterns, according to the requirements of the task at hand, so that the desired "tactile sight" or contact measurements can be obtained.

The sensors according to the invention can be miniaturized. The interdigital acoustic transducers 6 are similar to known filter elements used in communications engineering, particularly for television receivers. The transducers 6, oscillators 7, and compensating circuits can be applied as thin layers on the insulating plate 1. The electrical interconnection of the elements varies with the requirements of the tactile sensing task, but may readily understood and achieved by those knowledgeable in the art.

We claim:
1. A tactile sensor comprising,
 an insulating plate, having two sides;
 at least one pair of interdigital transducers of acoustic surface waves affixed to one side of the insulating plate;
 at least one oscillator affixed to the other side of the insulating plate and forming a resonant circuit with at least one interdigital transducer; and
 a diaphragm arranged on said one side of the insulating plate and having at least one projection facing the insulating plate, the projection in a first position being separated from the surface of said one side of the insulating plate by a gap, and in a second position being in contact with the surface of said one side of the insulating plate;
 such that acoustic surface waves are propagated from one of the interdigital transducers of said pair to the other transducer of said pair and received by said other transducer, said waves being disrupted by a movement of said diaphragm.

2. A tactile sensor as in claim 1, wherein said projection is situated between at least one pair of interdigital transducers and is at least equal in width to a width of the interdigital transducers.

3. A tactile sensor as in claim 1, wherein said projection is situated between at least one pair of interdigital transducers and is smaller in width than a width of the interdigital transducers.

4. A tactile sensor as in claim 1 wherein each said pair of interdigital transducers is provided with its own oscillator.

5. A tactile sensor as in claim 1 wherein each said pair of interdigital transducers is provided with its own diaphragm.

6. A tactile sensor as in claim 1 wherein a plurality of pairs of interdigital transducers share a common oscillator.

7. A tactile sensor as in claim 1 wherein a plurality of pairs of interdigital transducers share a common diaphragm.

8. A tactile sensor as in claim 1, further comprising a plurality of pairs of interdigital transducers arranged on said insulating plate.

9. A tactile sensor as in claim 8 wherein one of said plurality of pairs of interdigital transducers of acoustic surface waves respond to a different frequency than another of said plurality of pairs of interdigital transducers.

* * * * *